(12) United States Patent
Tsubata et al.

(10) Patent No.: US 7,319,239 B2
(45) Date of Patent: Jan. 15, 2008

(54) SUBSTRATE FOR DISPLAY DEVICE HAVING A PROTECTIVE LAYER PROVIDED BETWEEN THE PIXEL ELECTRODES AND WIRINGS OF THE ACTIVE MATRIX SUBSTRATE, MANUFACTURING METHOD FOR SAME, AND DISPLAY DEVICE

(75) Inventors: Toshihide Tsubata, Tsu (JP); Kenji Enda, Suzuka (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 11/126,743

(22) Filed: May 10, 2005

(65) Prior Publication Data

US 2005/0264736 A1    Dec. 1, 2005

(30) Foreign Application Priority Data

May 25, 2004    (JP)    ............... 2004-154506

(51) Int. Cl.
*G02F 1/1343*    (2006.01)
(52) U.S. Cl. .......... 257/72; 257/E21.414; 257/E21.703
(58) Field of Classification Search .................. 257/72, 257/E21.414, E21.703
See application file for complete search history.

(56) References Cited

U.S. PATENT DOCUMENTS

| 5,446,562 | A | * | 8/1995 | Sato | ............... 349/42 |
| 5,585,951 | A | | 12/1996 | Noda et al. | |
| 5,852,485 | A | * | 12/1998 | Shimada et al. | ............. 349/141 |
| 6,529,251 | B2 | | 3/2003 | Hibino et al. | |
| 6,683,666 | B1 | * | 1/2004 | Jang et al. | ................... 349/113 |
| 2002/0050594 | A1 | * | 5/2002 | Kim et al. | ..................... 257/59 |
| 2002/0131003 | A1 | * | 9/2002 | Matsumoto | ................. 349/139 |
| 2002/0132385 | A1 | * | 9/2002 | Dojo et al. | ................... 438/30 |

FOREIGN PATENT DOCUMENTS

| JP | 03-153217 | | 7/1991 |
| JP | 03-211526 | A | 9/1991 |
| JP | 6-242433 | A | 9/1994 |
| JP | 6-337436 | A | 12/1994 |
| JP | 09-152625 | | 6/1997 |
| JP | 2001-296551 | A | 10/2001 |
| KR | 2000-0062586 | A | 10/2000 |

* cited by examiner

*Primary Examiner*—Thomas L. Dickey
(74) *Attorney, Agent, or Firm*—Keating & Bennett, LLP

(57) ABSTRACT

The present invention provides the substrate for a display device, comprising a scan line, a signal line and a switching element on an insulating substrate, and further comprising an interlayer insulation film and a pixel electrode, the switching element is provided at an intersection of the scan line and the signal line, and have a gate electrode connected to the scan line, a source electrode connected to the signal line, and a drain electrode connected to the pixel electrode, the interlayer insulation film has a contact hole for connecting the drain electrode of the switching element to the pixel electrode, and a protective layer is provided above the scan line and/or the signal line in the substrate for a display device.

14 Claims, 13 Drawing Sheets

US 7,319,239 B2

SUBSTRATE FOR DISPLAY DEVICE HAVING A PROTECTIVE LAYER PROVIDED BETWEEN THE PIXEL ELECTRODES AND WIRINGS OF THE ACTIVE MATRIX SUBSTRATE, MANUFACTURING METHOD FOR SAME, AND DISPLAY DEVICE

REFERENCE TO RELATED APPLICATION

The Nonprovisional application claims priority under 35 U.S.C. § 119(a) on Patent Application No. 2004-154506 filed in Japan on May 25, 2004, the entire contents of which are hereby incorporated by reference.

BACKGROUND OF THE INVENTION

1. Field of the Invention

The present invention relates to a substrate for a display device, a manufacturing method for the same, and a display device. More specifically, the present invention relates to a substrate for a display device that can be applied to a liquid crystal display device and the like, a manufacturing method for the same, and a display device that has such a substrate.

2. Description of the Related Art

At present, liquid crystal display devices have characteristics such as compact, thin, lightweight, and low power consumption, and have been widely used in a variety of electronic apparatuses. In particular, active matrix type liquid crystal display devices (liquid crystal display panels) having switching elements as active elements have display properties of the same level as those of CRT's (cathode ray tubes), and therefore, have been widely applied in OA apparatuses, such as personal computers, AV apparatuses, such as television sets, and cellular phones. Such liquid crystal display devices recently have been larger and improved in qualities such as high-definition and improvement of effective area ratio of pixels (high aperture ratio) rapidly. Therefore, further improvement in the performance of substrates for display devices used in display devices such as liquid crystal display devices has been required, and improvement in design, manufacturing technology and the like has progressed.

Active matrix substrates are widely used as substrates for display devices such as liquid crystal display devices. A manufacturing technology for an active matrix substrate where pixel electrodes and source lines (signal lines) are formed on the same plane on a substrate is known, and in the case where an increase in the definition and the aperture ratio is achieved according to this technology, the distance between pixels and source lines, the width of source lines and the like have been reduced, in order to increase the effective area of pixels. However, reduction of the distance between pixels and source lines easily occurs defect of short-circuiting, and reduction of the width of source lines easily occurs defect of disconnected wirings. That is to say, occurrence of defect of short-circuiting poses reduction in yield according to a manufacturing technology for an active matrix where pixel electrodes and source lines are formed on the same plane on a substrate, and there is room for improvement in this respect.

For this reason, manufacturing methods for a transmission type liquid crystal display devices characterized by the following (a) to (c), for example, have been proposed (for example, refer to Japanese Kokai Publication Hei-09-152625 (pages 1 to 3)) with respect to a manufacturing method for an active matrix substrate, in order to prevent defects caused by short-circuiting and disconnected wirings as described above, as well as in order to improve reduction of the yield.

(a) A (transparent) interlayer insulation film is provided after switching elements (active elements) and source wirings (source lines) have been formed.

(b) Switching elements are brought into connect with (transparent) pixel electrodes through contact holes.

(c) Pixel electrodes are formed on the interlayer insulation film, and thereby, source wirings and pixel electrodes are not disposed on the same plane.

A liquid crystal display device is manufactured by attaching a color filter substrate so as to face the active matrix substrate manufactured as mentioned above and by injecting liquid crystal between these substrates. As for the color filter substrate, a substrate where color regions of R (red), G (green) and B (blue), for example, are provided so as to correspond to the pixel regions on the active matrix substrate side, and in addition, a black matrix (light blocking film) is provided in the portion other than the respective pixel regions, may be used.

FIG. 13 is a schematic plan diagram showing one pixel in an active matrix substrate (thin film transistor array substrate) according to the previous art, and a portion of a pixel adjacent to the pixel. As shown in FIG. 13, the gate line (scan line) 101 and the source line (signal line) 102 are placed so as to cross each other in one pixel of an active matrix substrate 130. A thin film transistor (hereinafter referred to also as TFT) 114, used as a switching element, and the pixel electrode 103 are disposed in the crossing portion. The TFT 114 is formed of the gate electrode 104 connected to the gate line 101, the source electrode 105 connected to the source line 102, the drain electrode 106 connected to the pixel electrode 103, and the semiconductor layer 125 in island form. The drain extracting-electrode 106' is connected to the pixel electrode 103 through a contact hole 109. In addition, the lead out drain electrode 106' faces a common capacitance line 107 with an intervening gate insulator 111, and thus, an auxiliary capacitor is formed.

Next, a manufacturing method for an active matrix substrate, particularly a thin film transistor array substrate, is briefly described with reference to FIGS. 13 to 17. FIG. 14 is a cross sectional diagram of the thin film transistor array substrate along line H-H' of FIG. 13, and FIG. 15 is a cross sectional diagram of the thin film transistor array substrate along line I-I' of FIG. 13. FIG. 16 is a schematic plan diagram showing terminals for leading out gate lines, and FIG. 17 is a schematic plan diagram showing terminals for leading out source lines.

When a thin film transistor array substrate is manufactured, first, the gate lines (scan lines) 101, the gate electrodes 104 and the common capacitance lines 107 are simultaneously formed by means of film formation, photolithography and etching on a substrate 110 made of a transparent insulating substrate, such as glass.

Next, thereon the gate insulator 111, the active semiconductor layer 112 and the low resistance semiconductor layer 113 made of n type amorphous silicon or the like are formed as films which are then converted to the island form 125 by means of photolithography and etching.

Next, the source lines 102, the source electrodes 105, the drain electrodes 106 and the lead out drain electrodes 106' are, simultaneously formed by means of film formation, photolithography and etching, and subsequently, the low resistance semiconductor layer 113 are separated into sources and drains through etching.

Next, the lower interlayer insulation film 120 made of SiNx or the like are formed as films so as to cover the entire surface, and subsequently, the upper organic interlayer insulation film 115 made of a photosensitive acryl resin or the like are formed by means of photolithography so as to have a pattern for contact holes 109, a pattern for contacts of the terminals for leading out gate lines (X in FIG. 16), and a pattern for contacts of the terminals for leading out source lines (Y in FIG. 17).

Next, the lower interlayer insulation film 120 and the gate insulator 111 are sequentially etched by using the upper organic interlayer insulation film 115 as a mask, in order to form the contact holes 109, the terminal for leading out gate line 200 and the terminal for leading out source line 300.

Next, the pixel electrodes 103, the uppermost layer electrodes 201 of the terminal for leading out gate line 200, and uppermost layer electrodes 301 of the terminal for leading out source line 300 are formed so as to cover the contact holes 109, the terminal for leading out gate line 200 and the terminal for leading out source line 300. The contact holes 109 allow the drain electrodes 106 in TFT's 114 and the pixel electrodes 103 to be connected to each other through the lead out drain electrodes 106'.

According to such a manufacturing method, the source lines 102 and the pixel electrodes 103 can be separated from each other with the intervening interlayer insulation films 115 and 120 in the active matrix substrate. Separation of the source lines 102 from the pixel electrodes 103 can prevent reduction of the yield caused by short-circuiting between the pixel electrode 103 and the source line 102, and at the same time, as shown in FIG. 13, the pixel electrodes 103 and the source lines 102 can be overlapped, resulting in improvement in the aperture ratio of the liquid crystal display devices or the like.

According to the above described manufacturing method for a substrate for a display device, however, in the case where a defect on the upper organic interlayer insulation film occurs, the lower interlayer insulation film and the gate insulator are etched from the film defect portion and short-circuiting occurs in a pixel electrode formed on the upper organic interlayer insulation film and therefore, there is room for improvement in terms of preventing defects in display, reductions in the quality of the display device, and in the yield.

A technology for making the gate insulating layer to have a two-layer structure formed of an oxide insulating layer produced by oxidizing a metal film and a gate insulator has been proposed for a previous substrate for a display device (for example, refer to Japanese Kokai Publication Hei-03-153217 (pages 1 and 3)). When a gate insulating layer has multiple layer structure according to this technology, however, effects of preventing defects of short-circuiting due to a defect on an interlayer insulation film cannot be obtained, when the insulating film existing lower than the uppermost layer is removed by etching with the uppermost interlayer insulation film as a mask. In addition, this technology provides measures against the defect of the gate insulator, and does not provide measures against the defect of a pixel caused by electrical leakage caused by the defect of the insulating film that exists between wirings, such as gate lines and source lines, and pixel electrodes in a substrate for a display device where the pixel electrodes are formed on the interlayer insulation film.

SUMMARY OF THE INVENTION

The present invention is provided in view of the above described current state, and an object of the invention is to provide a substrate for a display device that makes it possible to obtain a display device of a high display quality with a high yield by preventing short-circuiting between a pixel electrode and wirings, such as a scan line or a signal line, particularly when a substrate for a display device having high definition and a high aperture ratio is manufactured, and a manufacturing method for the same, as well as a display device that uses such a substrate.

The present inventors have, in a variety of manners, examined substrates for display devices having high definition and high aperture ratios and which make it possible to obtain a display device having a high display quality with a high yield, and have found that defect of film, such as peeling of an (upper) interlayer insulation film located beneath a pixel electrode may occur in a region where a wiring, such as a scan line (gate bus line) or a signal line (source bus line), and a pixel electrode overlap in a plane (region where the two overlap as viewed in the direction perpendicular to the surface of the substrate) in the conventional configuration of a substrate. The inventors focused on the occurrence of defects of leakage in such a case, since a gate insulator or the like in the defect portion is etched by using the (upper) interlayer insulation film as a mask for etching, and wirings, such as the scan line or the signal line (source bus line) is exposed, and then the exposed wiring and the pixel electrode make contact with each other by film forming and patterning of the pixel electrode. That is to say, when such a leakage occurs between the wiring and the pixel electrode, a potential written in a pixel cannot be maintained, leading to a point defect in the display. Therefore, inventors have found that providing a protective layer above the wiring such as the scan line and the signal line (source bus line) as a protective layer against etching can prevent contact between the pixel electrode and the wiring, leading to prevention of a defect of leakage caused by such short-circuiting. The inventors have found that, for example, a pattern of a semiconductor layer to form a switching element is disposed on a region where the scan line and the pixel electrode overlap on a plane, and thereby, this semiconductor layer pattern works as a protective film against etching, even when the interlayer insulation film is peeled, and thus, electrical leakage between the pixel electrode and the scan line can be prevented without increasing the number of steps in the manufacturing process for a substrate, and it becomes possible to provide a display device such as a liquid crystal display device having a high definition and a high aperture ratio with a high yield, and in this manner, means that can completely solve the above described problem are provided, leading to the completion of the present invention.

That is to say, the present invention provides a substrate for a display device, comprising a scan line, a signal line and a switching element on an insulating substrate, and further comprising an interlayer insulation film and a pixel electrode, wherein the switching element is provided at an intersection of the scan line and the signal line, and have a gate electrode connected to the scan line, a source electrode connected to the signal line, and a drain electrode connected to the pixel electrode, the interlayer insulation film has a contact hole for connecting the drain electrode of the switching element to the pixel electrode, and a protective layer is provided above the scan lines and/or the signal lines in the substrate for a display device.

The present invention also provides a substrate for a display device, comprising a scan line, a signal line, a common capacitance wiring and a switching element on an insulating substrate, and further comprising an interlayer insulation film and a pixel electrode, wherein said the switching element is provided at a intersection of the scan line and the signal line, and have a gate electrode connected to the scan line, a source electrode connected to the signal line, and a drain electrode connected to the pixel electrode, the interlayer insulation film has a contact hole for connecting the drain electrode of the switching element to the pixel electrode, and a protective layer is provided above at least one of wirings selected from the group consisting of the scan line, the signal line and the common capacitance wiring in the substrate for a display device.

EXPLANATION OF NUMERALS

Figure 1:
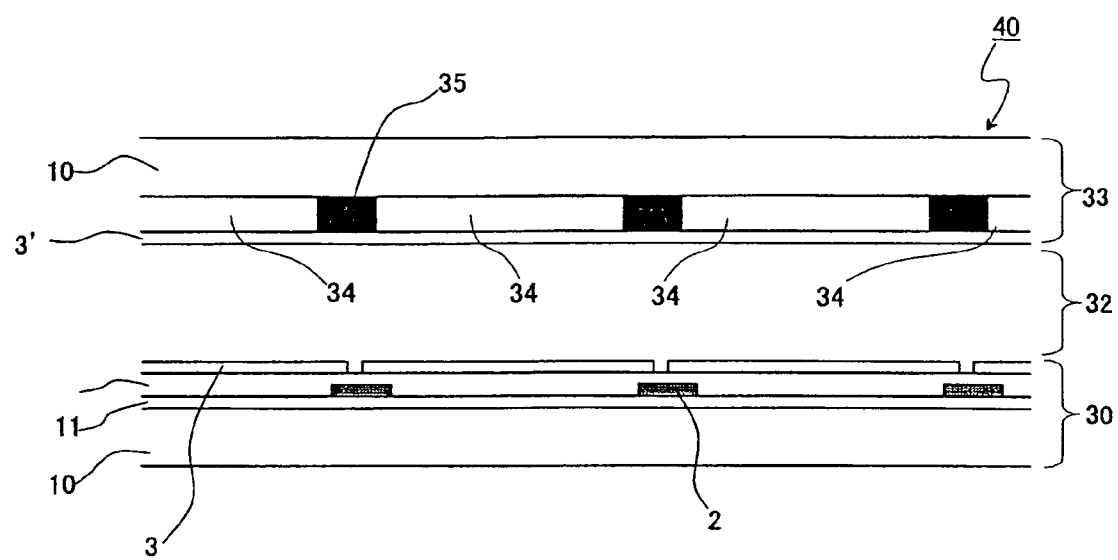
FIG. 1 is a schematic cross sectional diagram showing an example of a cross sectional configuration of a liquid crystal display device according to the present invention (Embodiment 1)

1: gate line (scan line)
2: source line (signal line)
3: pixel electrode
4: gate electrode
5: source electrode
6: drain electrode
6': lead out drain electrode
7: common capacitance line
8: protective film
9: contact hole
10: insulating substrate
11: gate insulator
12: active semiconductor layer
13: low resistance semiconductor layer
14: thin film transistor (switching element)
15: upper interlayer insulation film
20: lower interlayer insulation film
25: semiconductor layer pattern in island form
26: protective semiconductor layer
30: active matrix substrate (substrate for a display device)
32: liquid crystal layer
34: color filter
35: light blocking film
40: liquid crystal display devices
101: gate line (scan line)
102: source line (signal line)
103: pixel electrode
104: gate electrode
105: source electrode
106: drain electrode
106': lead out drain electrode
107: common capacitance line
109: contact hole
110: substrate
111: gate insulator
112: active semiconductor layer
113: low resistance semiconductor layer
114: thin film transistor (switching element)
115: upper organic interlayer insulation film
120: lower interlayer insulation film
125: semiconductor layer pattern in island form
130: active matrix substrate (substrate for a display device)
200: terminal for leading out gate line
201: uppermost layer electrodes of terminals for leading out gate line
300: terminal for leading out source line
301: uppermost layer electrodes of terminals for leading out source line

DESCRIPTION OF THE PREFERRED EMBODIMENTS

A substrate for a display device according to the present invention has either (A) a configuration where a scan line, a signal line and a switching element are provided on an insulating substrate, and in addition, an interlayer insulation film and a pixel electrode are provided, or (B) a configuration where a scan line, a signal line, a common capacitance wiring and a switching element on an insulating substrate, and in addition, an interlayer insulation film and a pixel element are provided. The above mentioned configuration (A) preferably has a layered structure having (1) the insulating substrate, (2) the scan line, the signal line and the switching element, (3) the interlayer insulation film, and (4) the pixel electrode, in this order, and specifically, has the configuration in which the signal line and the scan line are provided on the insulating substrate, each intersection where the signal line and the scan line cross has the switching element and the pixel electrode, the interlayer insulation film is provided above the signal line, the scan line and the switching element, and the pixel electrode are provided on the interlayer insulation film. The above-mentioned configuration (B) preferably has a layered structure having (1) the insulating substrate, (2) the scan line, the signal line, the common capacitance wiring and the switching element, (3) the interlayer insulation film, and (4) the pixel electrode or the like, in this order.

The above described switching element is provided at the intersection of the scan line and the signal line, and have the gate electrode connected to the scan line, the source electrode connected to the signal line, and the drain electrode connected to the pixel electrode. And a gate insulator is usually formed between the scan line (gate electrode) and the signal line (source electrode), as well as between the scan line (gate electrode) and the drain electrode. In addition, the interlayer insulation film has a contact hole for connecting the drain electrode of the switching element to the pixel electrode.

The substrate for a display device according to the present invention has such a configuration, and thereby, can carry out driving control of the switching element by means of currents (gate signal) to flow through the scan line, and at the same time, carry out driving control of the pixel electrode by means of currents (data signals) to flow through the signal line when the switching element is in the ON state, and in addition, the interlayer insulation film is provided in order to prevent the pixel electrode and the signal line from being short-circuited.

According to the present invention, the protective layer is provided above the scan line and/or the signal line in the above described configuration (A), and the protective layer is provided above at least one of wirings selected from the group consisting of the scan line, the signal line and the common capacitance wiring in the above configuration (B). That is to say, according to the present invention, the protective layer is provided above at least one of the scan line, the signal line or the common capacitance wiring. As a result of this, the protective layer functions as a protective film against etching when etching is carried out in order to form the contact hole in the interlayer insulation film, and therefore, the wirings, such as the scan line, can be prevented from being exposed after etching, even in the case where a portion of the pattern of the interlayer insulation film used as an etching mask has defect. Consequently, contact between the pixel electrode on the interlayer insulation film and wirings, such as the scan line, can be prevented, and thus, short-circuiting can be prevented, and therefore, the occurrence of a defect in a pixel can be prevented, leading to improvement in the display quality and the yield obtained particularly at the time of manufacturing a substrate for a display device having high definition and a high aperture ratio.

The material, thickness and the like of the above described protective layer are not particularly limited, as long as working effects of prevention of exposure in wirings, such as the scan line, at the time of etching of the interlayer insulation film can be obtained. Also, the protective layer may be formed of the same material as that of another layer adjacent, such as the interlayer insulation film or the gate insulator, as long as the protective layer can protect the lower portion at the time of etching, and in such a case, when the protective layer and the other layers adjacent thereto are integrated with each other in the cross section, and therefore to determine the border between the layers is difficult, confirmation of difference in the plan form between the protective layer and the other layers adjacent thereto, that is to say, the difference in the thickness between the integrated portion (protective layer+other layers adjacent thereto) and the portion not integrated (only protective layer or only other layers adjacent thereto) enables determination of the protective layer.

In addition, according to the present invention, "a protective layer is provided above" means that the protective layer may be provided on top of the wirings, such as the scan line, so as to contact with the wirings, such as the scan line, or that the protective layer may be provided above wirings such as the scan line via one or more layers, so as not to contact with the wirings, such as the scan line. As for a mode where a protective layer is provided so as not to make contact with the scan line, for example, mentioned may be a mode where the protective layer is provided on the gate insulator, a mode where the protective layer is provided in the interlayer insulation film and the like.

Next, described is the material of each component other than the protective layer to form the substrate for a display device according to the present invention. For the insulating substrate, those made of a transparent insulator, such as glass, are preferably used.

The material of the scan line, the signal line and the common capacitance wiring is not particularly limited, as long as the desired wiring resistance can be obtained, and mentioned may be metals, such as tantalum (Ta), titanium (Ti), chromium (Cr) and aluminum (Al), alloys thereof and layered film, such as Ti/Al/Ti, where these metals are layered. The width, the thickness, the pattern forms and the like of the scan line, the signal line and the common capacitance wiring are not particularly limited.

The switching element is not particularly limited as long as they have the gate electrode, the source electrode and the drain electrode, and mentioned may be an amorphous silicon thin film transistor, a microcrystal silicon thin film transistor, a polysilicon thin film transistor, CGS (Continuous Grain Silicon) thin film transistor and the like. In addition, the gate electrode is usually formed so as to be integrated with the scan line, and the source electrode and the drain electrode are formed so as to be integrated with the signal line.

The material of the interlayer insulation film is not particularly limited, as long as the desired dielectric constant, transmittance, etching selective ratio and the like can be obtained, and mentioned may be silicon nitride ($SiN_x$), a photosensitive transparent resin, silicon oxide ($SiO_2$) and the like. Examples of the photosensitive transparent resin that may be used for the interlayer insulation film include, for example, an acryl based resin, an epoxy based resin, a polyurethane based resin, a polyimide based resin and the like. The interlayer insulation film may be formed of one layer or two or more layers, and the thickness thereof is not particularly limited.

The contact hole formed in the interlayer insulation film is not particularly limited, as long as the drain electrodes of the switching element may be connected to the pixel electrode thereby, and the shape, size, number, arrangement and the like thereof are not particularly limited. A conductive film for making electrical connections between the drain electrodes of the switching elements and the pixel electrodes is usually formed within the contact hole.

For the material of the pixel electrode, preferably used may be transparent conductive materials, such as ITO (indium tin oxide), IZO (indium zinc oxide) and the like, and in the case of a substrate for a display device used for a reflective type liquid crystal display devices or the like, metals, such as aluminum and silver, also may be preferably used.

The configuration of the substrate for a display device according to the present invention is not particularly limited, as long as it has these components as essential components, and other components may be included or not included.

The substrate for a display device according to the preferred embodiments of the present invention is hereinafter described in detail.

The above described protective layer is preferably provided beneath the interlayer insulation film. As a result of this, when etching is carried out for formation of the contact hole in the interlayer insulation film, the protective layer can function as a protective film against etching, and easier formation of the protective layer is possible as compared with a mode where the protective layer is formed in the interlayer insulation film.

In addition, according to the present invention, "beneath the interlayer insulation film" means on the underside of the interlayer insulation film or below the interlayer insulation film by one or more layers, and specifically, a mode where the protective film for the scan line is provided on the gate insulator may be provided, or a mode where the protective layer for the scan line is provided on top of the scan line so as to contact with the scan line.

The above described protective layer is preferably formed of a semiconductor, and preferably has substantially the same composition as that of the semiconductor layer to form the switching element. In such a case, the formation of the protective layer can be simultaneously carried out as the formation of the semiconductor layer to form the switching element, and therefore, the substrate for a display device according to the present invention may be manufactured without adding a forming process for the protective layer to the manufacturing process for a substrate for a display device according to the previous art, resulting in shortening of the manufacturing process. For the semiconductor, a semiconductor to form the semiconductor layer of the switching element is preferable, and specifically, a semiconductor that is formed primarily of amorphous silicon may be mentioned.

And "substantially the same composition" preferably has a component that can be evaluated to have substantially the same component, and the component may be sufficient as long as the formation of the semiconductor layer to form the switching element and that of the protective layer can be simultaneously carried out in accordance with a CVD (chemical vapor deposition) method or the like.

The above described protective layer is preferably separated from the semiconductor layer to form the switching element. As a result of this, even in the case where leakage occurs between the protective layer (semiconductor layer) provided above the scan line and the signal line adjacent to the switching element and connected to the switching element, electrical leakage between the scan line and the drain electrode connected to the switching element can be prevented, and therefore, the occurrence of a defect in a pixel can be prevented.

The above described protective layer is preferably formed of silicon nitride (SiNx), silicon dioxide ($SiO_2$) or a resin. As a result of this, the protective layer can effectively function as a sufficient protective film against etching, when etching is carried out, for example, for the formation of the contact hole in the interlayer insulation film, and the formation of the protective layer can be easily carried out. As for the resin, a photosensitive transparent resin is preferable, because of ease of patterning. Examples of the photosensitive transparent resin that can be used for the protective layer include an acryl based resin, an epoxy based resin, a polyurethane based resin and a polyimide based resin. In the case where a material other than a photosensitive resin is used for the protective layer, patterning may be carried out by film formation, application of photosensitive resin in liquid form and then photolithography (exposure to light and development), dry etching and the like.

The above described protective layer preferably has substantially the same composition as that of the source electrodes and/or the drain electrodes to form the switching element. In such a case, the formation of the protective layer can be carried out simultaneously with the formation of the source electrode or the drain electrode to form the switching element, and therefore, the substrate for a display device according to the present invention may be manufactured without adding a forming process for the protective layer to the manufacturing process for a substrate for a display device according to the previous art, and thus, shortening of the manufacturing process can be achieved.

And "substantially the same composition" preferably means a component that can be evaluated to have substantially the same component, the component may be sufficient as long as the formation of the source electrode and/or the drain electrode to form the switching element and that of the protective layer can be simultaneously carried out.

The above described protective layer is preferably disposed at least in portions where the scan line and the pixel electrode overlap as viewed in the direction perpendicular to the surface of the insulating substrate. As a result of this, exposure of the scan line due to etching may be sufficiently prevented, and thus, the working effects of the present invention of preventing short-circuiting between pixel electrode and scan line may be sufficiently obtained. More preferred is a mode in which the protective layer is disposed only in a portion where the scan line and the pixel electrode substantially overlap as viewed in the direction perpendicular to the surface of the insulating substrate. In this mode, the working effects of the present invention of preventing short-circuiting between pixel electrode and scan line can be sufficiently obtained, and at the same time, an increase in the load capacitance of the scan line can be restricted to the minimum, and reduced, as compared with a case where, for example, the protective layer is provided so as to completely cover the scan line.

Additionally, the above description of "as viewed in the direction perpendicular to the surface of the insulating substrate" means, in other words, "when the orthogonal projection of the object is viewed on the surface of the insulating substrate." More specifically, it means "when the collection of the intersections between the surface of the insulating substrate and lines perpendicular to the surface drawn from respective points on the object is viewed." Accordingly, in this case, it means that the orthogonal projection of the scan line on the surface of the insulating substrate, the orthogonal projection of the protective layer and the orthogonal projection of the pixel electrodes overlap. In addition, the above description of "the portion where the scan line and the pixel electrode substantially overlap" preferably means the portion that is evaluated as a portion where the scan line and the pixel electrode substantially overlap, but may include the peripheral portions thereof, as long as the effects of restricting an increase in the load capacitance of the scan lines to the minimum may be obtained.

The above described protective layer is preferably disposed so as to overlap the scan line and not to overlap the signal line as viewed in the direction perpendicular to the surface of the insulating substrate. As a result of this, the occurrence of leakage between scan line and signal line may be prevented, in the case where the protective film is formed of a semiconductor.

It is preferable for the above described interlayer insulation film to be formed of an insulating film having at least two layers, and for the uppermost layer of insulating film to be an organic film. As a result of this, etching can be carried out by using the organic film which is the uppermost layer to form the interlayer insulation film as a mask, and the efficiency of the manufacture of a substrate may be improved, as compared with a case where a mask is separately formed on the interlayer insulation film and removed after etching, or a case where etching is carried out using the entire interlayer insulation film as a mask.

The organic film is not particular limited, as long as it is made of a material that can obtain the desired dielectric constant, transmittance, etching selective ratio and the like, and is appropriately selected depending on the etching condition and the like, and mentioned may be a photosensitive transparent resin, such as an acryl based resin, an epoxy based resin, a polyurethane based resin and a polyimide based resin.

The present invention also provides a manufacturing method for forming the substrate for a display device according to the present invention having substantially the same composition as that of a semiconductor layer that forms the switching element, said manufacturing method for the substrate for a display device has a process for simultaneously forming the protective layer and the semiconductor layer that forms the switching element. The present invention further provides a manufacturing method for forming+the substrate for a display device according to the present invention having substantially the same composition as that of the source electrode and/or the drain electrode that form the switching element, said manufacturing method for the substrate for a display device has a process for simultaneously forming a protective layer and source electrode and/or drain electrode that form the switching elements. According to these methods, the substrate for a display device according to the present invention may be manufactured without adding a forming process for the protective layer to the manufacturing process for a substrate for a display device according to the previous art, and thus, shortening of the manufacturing process can be achieved.

The present invention further provides a manufacturing method for a substrate for a display device according to the present invention having an interlayer insulation film formed of at least two layers of insulating film, and the top layer thereof is an organic film, said manufacturing method for the substrate for a display device has a process for simultaneously forming the contact hole, a terminal for leading out the scan line and a terminal for leading out the signal line by carrying out etching using the organic film of the top layer that forms the interlayer insulation film as a mask. As a result of this, and the efficiency of the manufacture of the substrate may be improved, as compared with a case where a mask is separately formed on the interlayer insulation film and removed after etching, or a case where etching is carried out using the entire interlayer insulation film as a mask. In addition, the efficiency in the manufacture of a substrate also may be improved by simultaneously forming the terminal for leading out the scan line and the terminal for leading out the signal line in forming process of the contact hole.

Additionally, the contact hole in the organic film of the uppermost layer are formed in advance at the time of formation of the organic film, and therefore, the contact hole in the portion other than the organic film of the uppermost layer are formed by etching in the above described forming process of the contact hole.

The present invention also provides a display device with a substrate for a display device according to the present invention, or a substrate for a display device manufactured by the manufacturing method for a substrate for a display device according to the present invention. The display device is not particularly limited, as long as the display can be controlled by supplying electrical signals to the scan line, the signal line and the like on the substrate for the display device. Examples of such a display include a liquid crystal display device, an organic electroluminescence (EL) display or the like, and in particular, a liquid crystal display is preferable. In such a display, the pixel electrode and wirings, such as scan lines, are prevented from short-circuiting, and the occurrence of a pixel defect is effectively prevented, and therefore, satisfactory display quality with fewer pixel defects can be obtained even if the display device has high definition and high aperture ratio, and the yield may be improved.

A substrate for a display device according to the present invention has a configuration where the pixel electrode are provided on a different plane from the plane where the scan line, the signal line and the switching element are formed, and the protective layer is provided above wirings, such as the scan line, and therefore, the occurrence of the pixel defect caused by short-circuiting between the pixel electrode on the interlayer insulation film and wirings, such as the scan line, may be prevented. In the case where such a substrate for a display device is used for a display device, satisfactory display quality with fewer pixel defects can be obtained in the display device particularly having high definition and a high aperture ratio may be obtained, and effect of improved yield may be obtained.

The present invention will be, hereinafter, described in more detail with reference to embodiments, the present invention is not limited to only these embodiments.

Embodiment 1

Embodiment 1, which is one embodiment of the present invention, is described below, with reference to FIGS. 1 to 4.

And according to the present embodiment, an active matrix substrate for a liquid crystal display device is described as a specific example of a substrate for a display device.

FIG. 1 is a schematic cross sectional diagram showing one example of the configuration of a liquid crystal display device according to the present invention.

As shown in FIG. 1, the liquid crystal display devices 40 has the active matrix substrate (substrate for a display device) 30 and the facing substrate 33 having the color filter 34 and the light blocking film 35, and these substrates sandwich the liquid crystal layer 32. The liquid crystal layer 32 is placed between the orientation film (not shown) of the facing substrate 33, and the orientation film (not shown) of the active matrix substrate 30.

Figure 2:
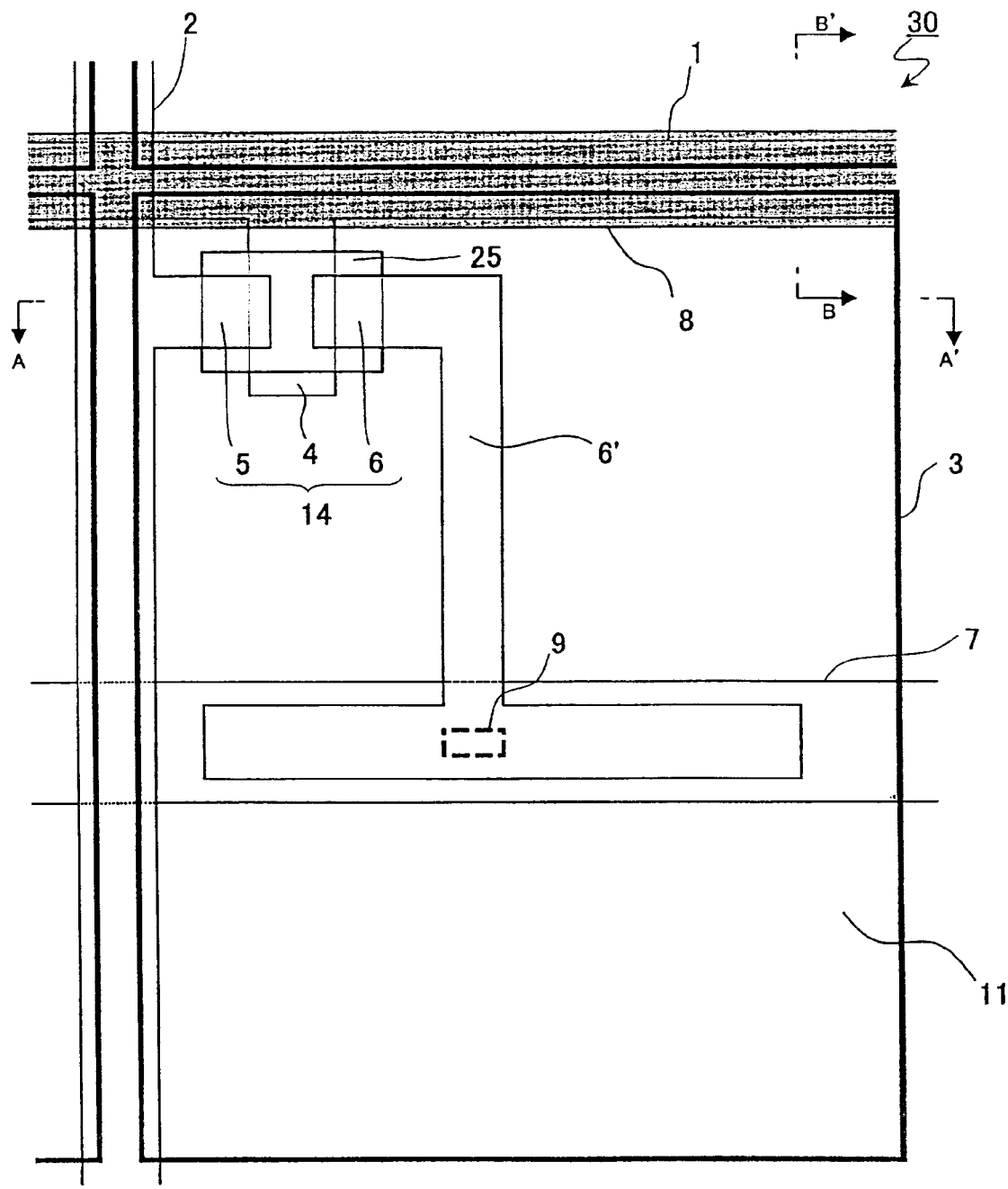
FIG. 2 is a schematic plan diagram showing one pixel in an active matrix substrate (substrate for a display device) according to the present invention (Embodiment 1)
Figure 3:
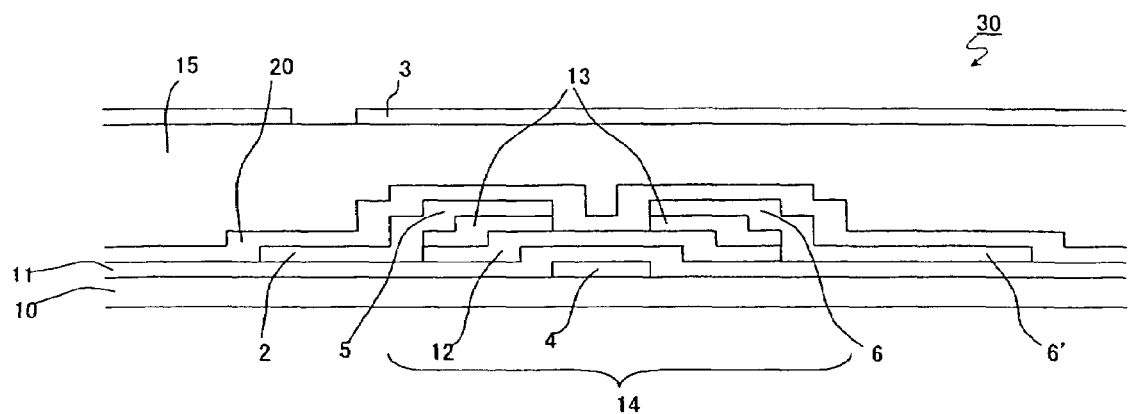
FIG. 3 is a cross sectional diagram of the substrate for a display device along line A-A' of FIG. 2.

FIG. 2 is a schematic plan diagram showing one pixel in active matrix substrate 30 of the present invention. FIG. 3 is a cross sectional diagram showing the substrate for a display device along line A-A' of FIG. 2, and FIG. 4 is a cross sectional diagram showing the substrate for a display device along line B-B' of FIG. 2.

As shown in FIG. 2, in the active matrix substrate 30, the gate line (scan line) 1, the source line (signal line) 2 and the pixel electrode 3 are formed as layers on the insulating substrate 10. The gate line 1 and the source line 2 are disposed so as to cross to each other. The switching element (TFT) 14 and the pixel electrode 3 are provided at each intersection of these lines. And the insulating substrate 10 is positioned as the backmost layer of FIG. 2 and disposed at the position shown in the cross sectional diagrams of FIGS. 3 and 4. The gate electrode 4 of the switching element 14 is formed on the gate line 1, and the source electrode 5 of the switching element 14 is formed on the source line 2. And the pixel electrode 3 is connected to the drain electrode 6 of the switching element 14 through the lead out drain electrode 6'. This lead out drain electrode 6' faces the auxiliary capacitor bus line 7 with the intervening gate insulator 11, and thereby, an auxiliary capacitor is formed.

Figure 4:
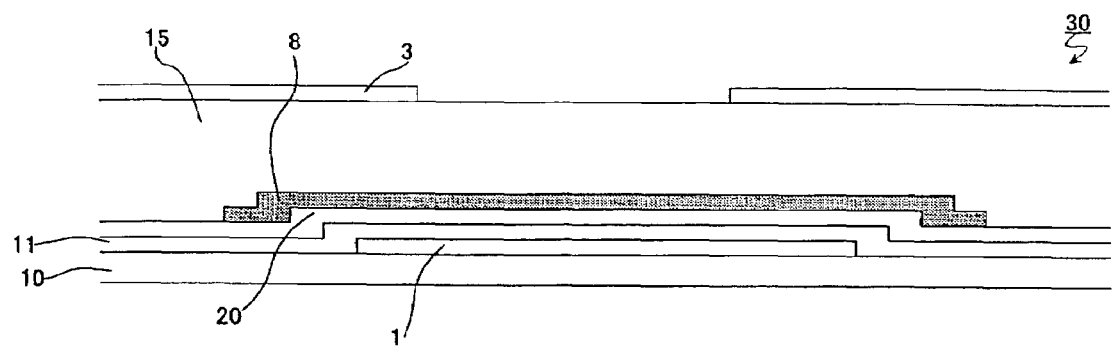
FIG. 4 is a cross sectional diagram of the substrate for a display device along line B-B' of FIG. 2.

As shown in FIG. 4, the active matrix substrate 30 is provided with the protective film (protective layer) 8 on the gate insulator 11 so as to cover the surface of the gate line 1. As shown in FIG. 2, the active matrix substrate 30 has the region where the gate line 1, the protective film 8 covering the surface of the gate line 1, and the pixel electrode 3 overlap as viewed in the direction perpendicular to the surface of the insulating substrate 10, that is, a region where the orthogonal projection of the gate line 1 on the surface of the insulating substrate 10, the orthogonal projection of the protective film 8 on the surface of the insulating substrate 10, and the orthogonal projection of the pixel electrode 3 on the surface of the insulating substrate 10 overlap.

Next, control of current and voltage in the liquid crystal display devices 40 is briefly described.

In the liquid crystal display devices 40, voltage is applied to the gate electrode 4 when the gate line 1 is selected. The voltage applied to this gate electrode 4 controls a current to flow between the source electrode 5 and the drain electrode 6. Then, current flows from the source electrode 5 to the drain electrode 6, and from the drain electrode 6 to the pixel electrode 3 through the lead out drain electrode 6', on the basis of the signal transmitted from the source line 2, and thereby, the pixel electrode 3 displays in a predetermined manner in the configuration. The auxiliary capacitor bus line 7 is secondarily installed to maintain the predetermined display in the pixel electrode 3.

Next, an example of a manufacturing method for the active matrix substrate 30 according to the present embodiment is described with reference to FIGS. 2, 3 and 4.

In the manufacturing of the active matrix substrate 30 according to the present embodiment, the thin film transistor (TFT) 14 is formed. First, a layered film made of Ti/Al/Ti is formed by means of sputtering on the insulating substrate 10 made of a transparent insulator, such as glass, and followed by photolithography, dry etching and removal of the resist, and thereby, the gate line 1, the gate electrode 4 and the common capacitance line 7 are simultaneously formed. Next, on top of the surfaces of these, a gate insulator 11 made of an SiNx (silicon nitride) film having a thickness of approximately 4000 Å is formed using a mixed gas of an $SiH_4$ gas, an $NH_3$ gas and an $N_2$ gas, an active semiconductor layer 12 made of amorphous silicon having a thickness of approximately 1500 Å is formed using a mixed gas of an $SiH_4$ gas and an $H_2$ gas, and an n type low resistance semiconductor layer 13 into which phosphorous is doped having a thickness of approximately 500 Å is formed using a mixed gas of an $SiH_4$ gas, a $PH_3$ gas and an $H_2$ gas, sequentially, according to CVD, followed by photolithography, dry etching and removal of the resist, so that an island form 25 is formed. Subsequently, a layered film made of Ti/Al/Ti is formed by means of sputtering, followed by photolithography and dry etching, so that the source line 2, the source electrode 5, the drain electrode 6 and the lead out drain electrode 6' are simultaneously formed. Furthermore, the n type low resistance semiconductor layer 13 is etched, so that the source and the drain are separated from each other, and then, the resist is removed. In this manner, the thin film transistor (TFT) 14 is formed.

Next, the lower interlayer insulation film 20 made of SiNx having a thickness of approximately 3000 Å is formed so as to cover the entire surface of the substrate according to CVD using a mixed gas of an $SiH_4$ gas, an $NH_3$ gas and an $N_2$ gas. Subsequently, a film of SiNx having a thickness of approximately 4000 Å is formed according to CVD using a mixed gas of an $SiH_4$ gas, an $NH_3$ gas and an $N_2$ gas, followed by photolithography and dry etching using a mixed gas of a $CF_4$ gas and an $O_2$ gas, and thereby, the protective film 8 is formed.

Figure 16:
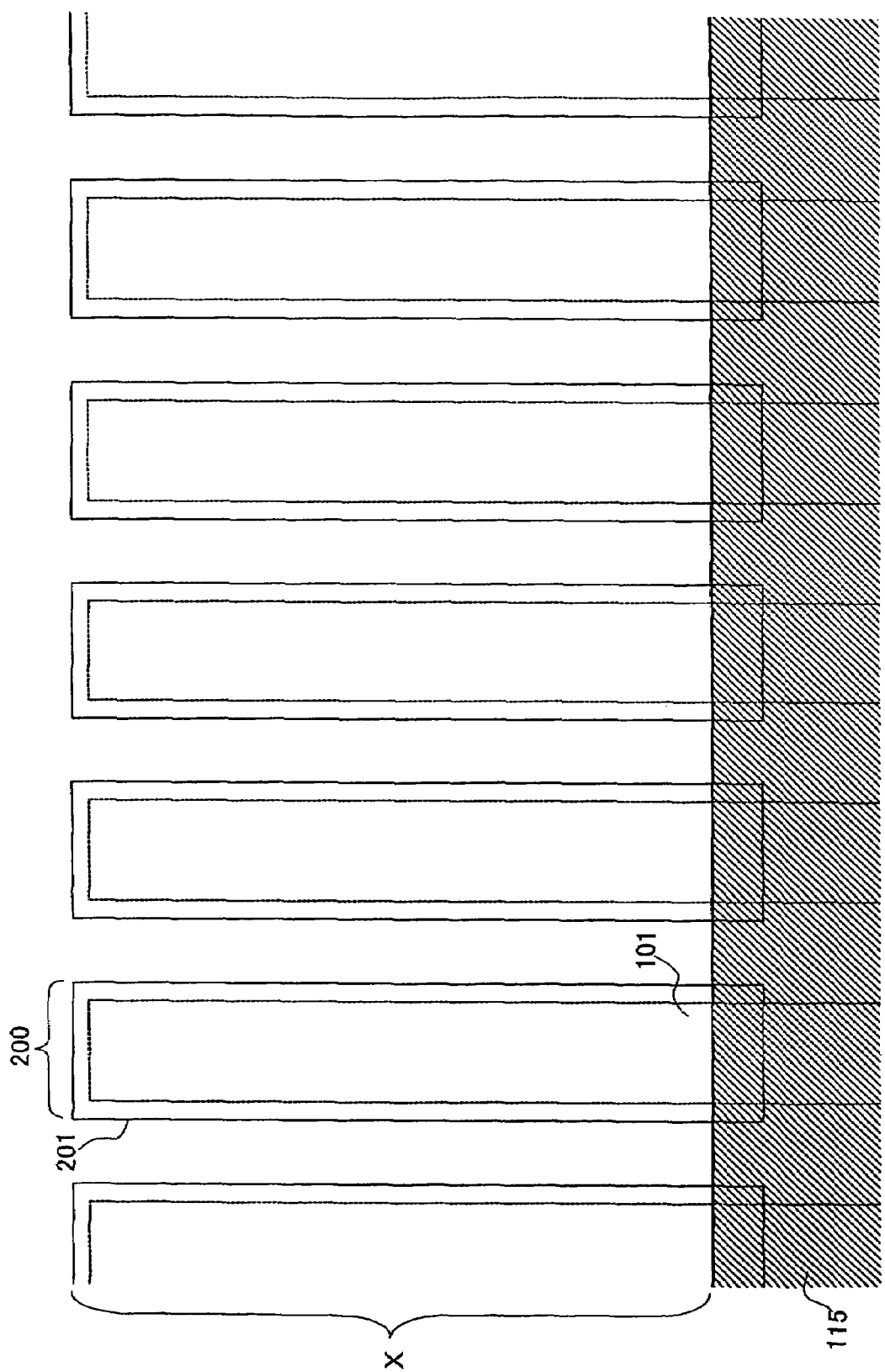
FIG. 16 is a schematic plan diagram showing terminals for leading out gate lines of a display device substrate to the outside.
Figure 17:
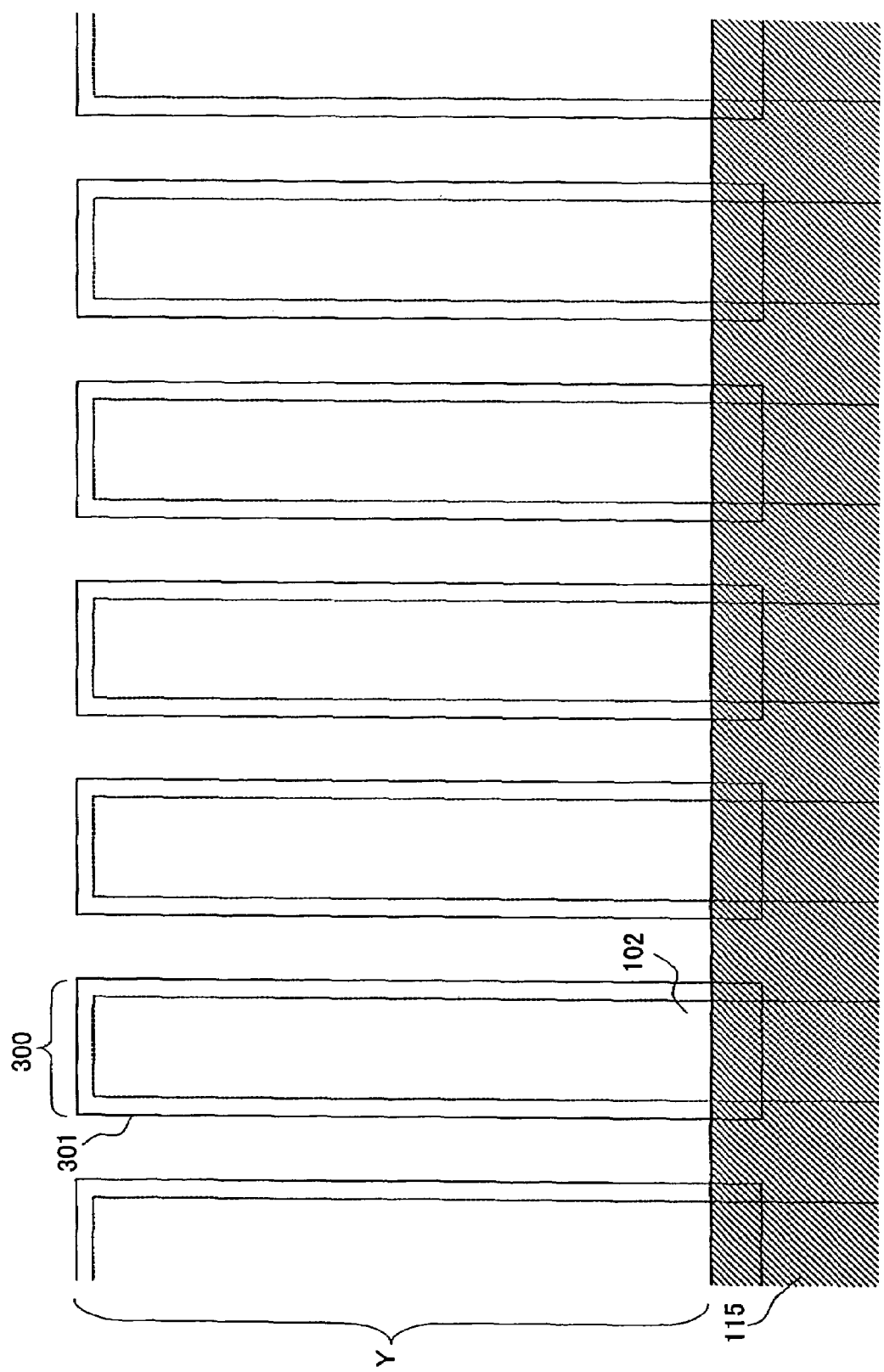
FIG. 17 is a schematic plan diagram showing terminals for leading out source lines of a display device substrate to the outside.

Then the upper layer organic insulating film 15 made of a positive type photosensitive acryl resin having a thickness of approximately 3 μm is formed by means of photolithography so that the contact hole 9, the pattern for contact of terminals for leading out gate lines (X in FIG. 16), and the pattern for contact of terminals for leading out source lines (Y in FIG. 17) is provided.

Next, in order to form the contact hole 9, terminal for leading out gate line 200 and terminal for leading out source line 300, the lower interlayer insulation film 20 and the gate insulator 11 are sequentially etched by means of dry etching using a mixed gas of a $CF_4$ gas and an $O_2$ gas, and using the upper layer organic insulating film 15 as a mask.

After that, a transparent electrode is formed, by means of sputtering, so as to cover the entire surface of the substrate having the contact hole 9. Then, the formed transparent electrode is patterned by means of photolithography and wet etching so as to remove the resist, and thereby, the pixel electrode 3 is obtained.

In the present embodiment, Ti/Al/Ti is used as the material for the gate line 1 and the source line 2, but the material is not particularly limited, as long as it is a metal that provides a desired line resistance, for example, metals such as tantalum (Ta), titanium (Ti), chromium (Cr) and aluminum (Al), as well as alloys thereof, may be used. For the material of the gate line 1 and the source line 2, a film having a layered structure of TaN/Ta/TaN may be used. And for the material of the source line 2, a transparent conductive film, such as ITO, for example, may be used in addition to a general metal film.

In the present embodiment, an amorphous silicon thin film transistor is used as the switching element 14, a microcrystal silicon thin film transistor, a polysilicon thin film transistor and a CGS thin film transistor, for example, may be also used.

ITO is used for pixel electrode 3 in the present embodiment, a transparent electrode, such as one of IZO, may be used. And in the case of a reflective type liquid crystal display devices, an electrode material that reflects light from the outside may be used as the pixel electrode 3, and metals such as Al and Ag, for example, may be used.

A positive type acryl based photosensitive transparent resin is used for the upper interlayer insulation film 15 in the present embodiment, but the material is not particularly limited, as long as desired dielectric constant, transmittance and etching selective ratio of the lower interlayer insulation film 15 to the gate insulator 11 are obtained, and a negative type photosensitive resin or an $SiO_2$ (silicon oxide) film, for example, may be used.

In the preset embodiment, an SiNx film according to a CVD method is used as the lower interlayer insulation film 20, but a positive type or negative type photosensitive transparent resin may be used. In addition, a photosensitive transparent resin, an $SiO_2$ film or the like may be used in addition to an SiNx film, as the protective film 8. Examples of the photosensitive transparent resin used for the lower interlayer insulation film 20 and the protective film 8 include an acryl based resin, an epoxy based resin, a polyurethane based resin and a polyimide based resin.

Figure 11:
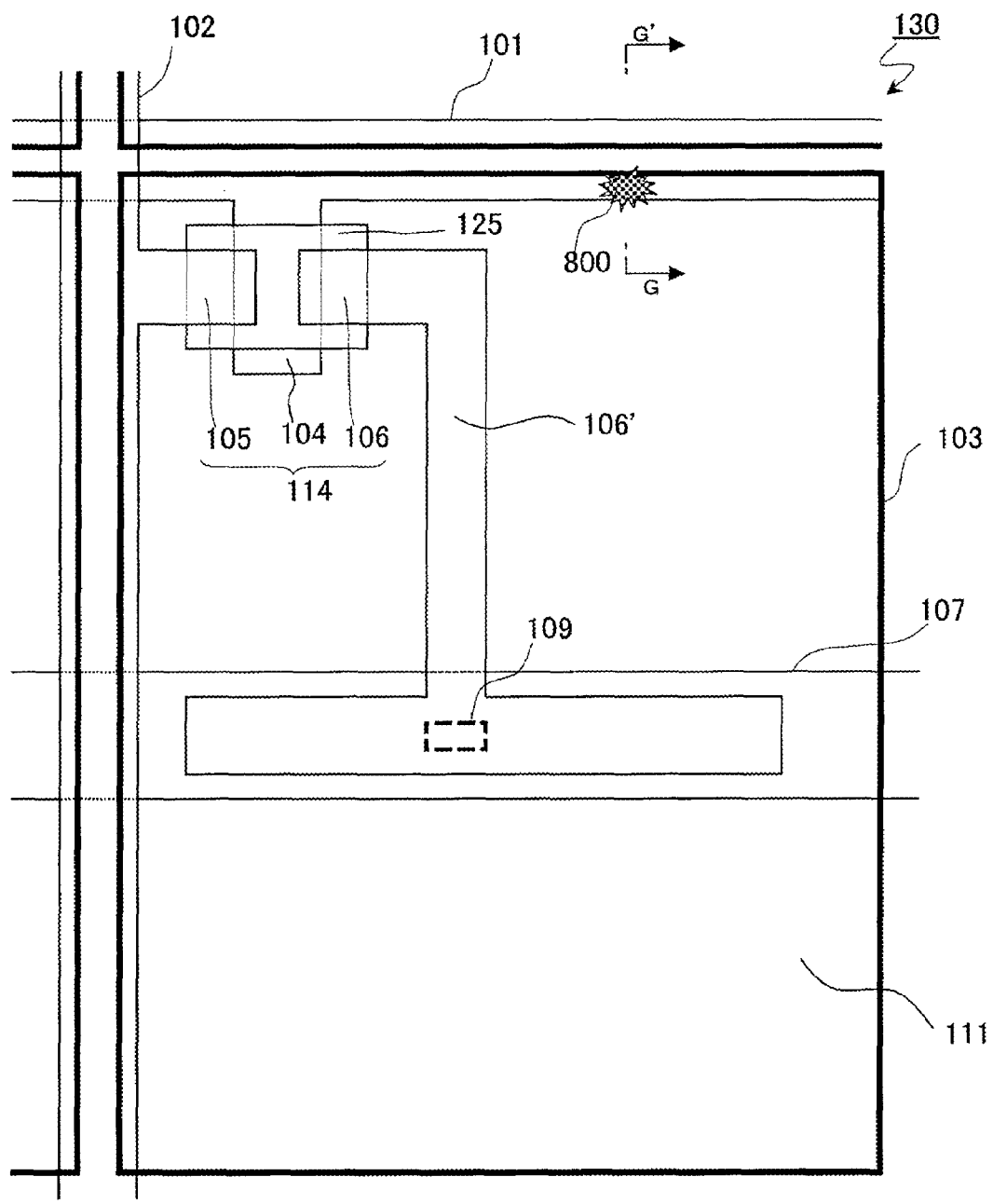
FIG. 11 is a schematic plan diagram showing an active matrix substrate according to the previous art in the state where the upper interlayer insulation film is peeled and leakage is caused between a pixel electrode and a gate line at leak point 800.
Figure 12:
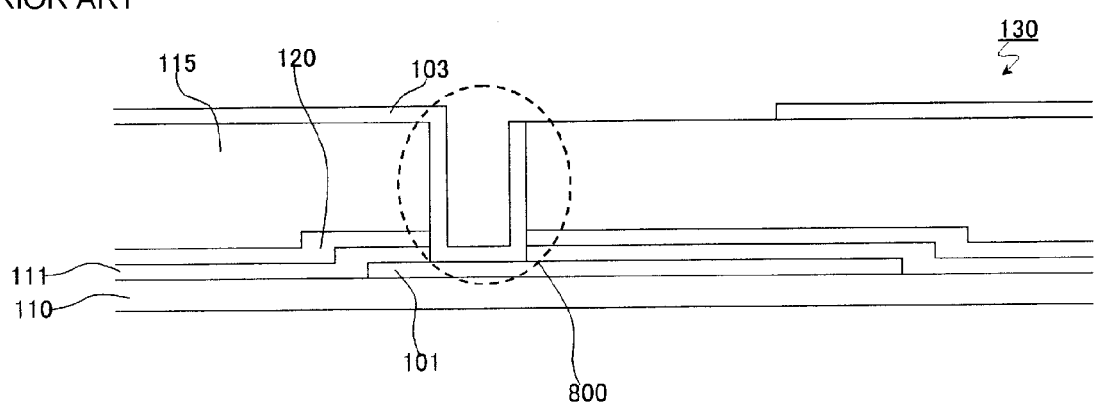
FIG. 12 is a schematic cross sectional diagram showing the cross section of leak point 800 along line G-G' of FIG. 11.
Figure 13:
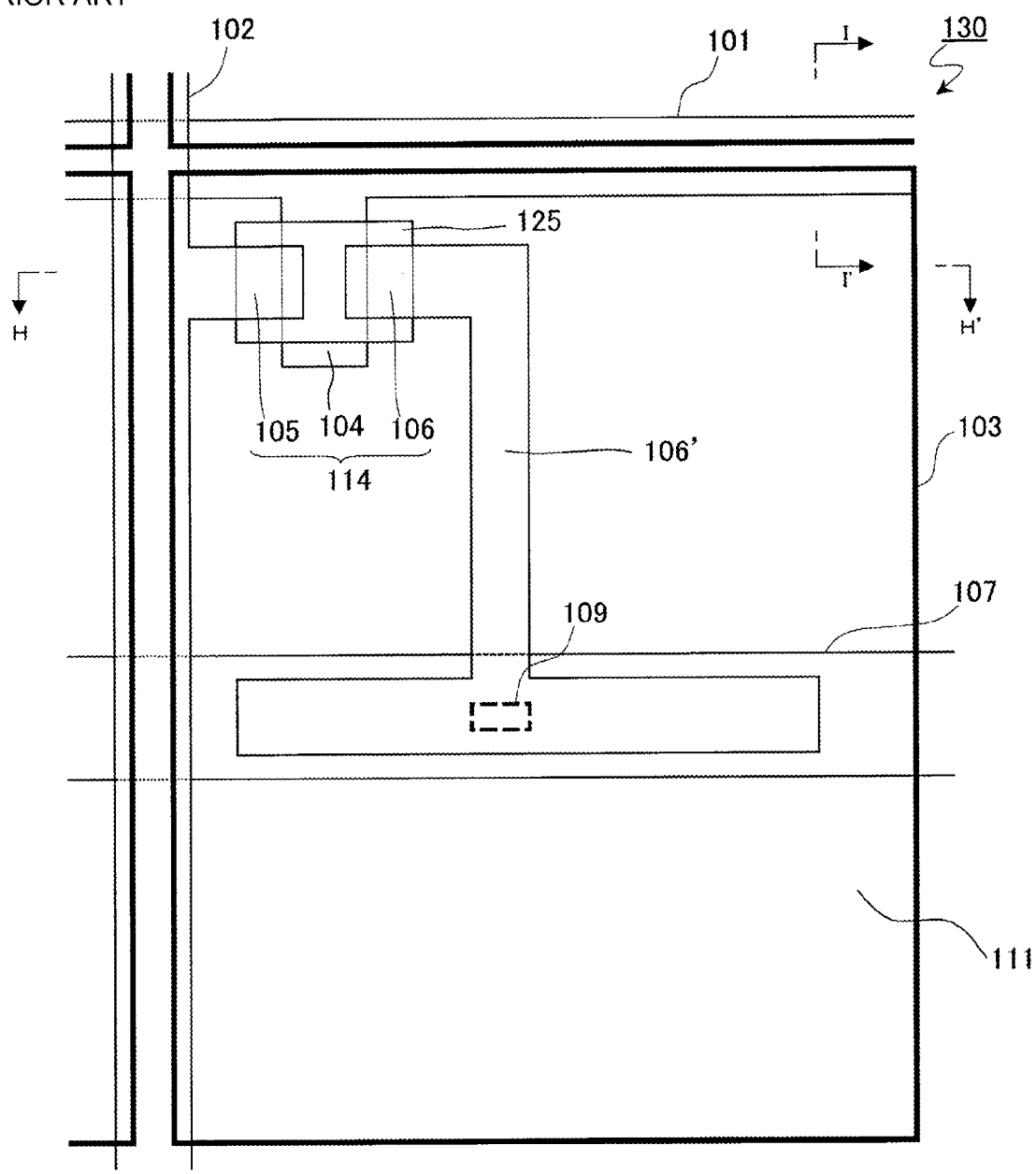
FIG. 13 is a schematic plan diagram showing one pixel in an active matrix substrate (thin film transistor array substrate) according to the previous art, and a portion of a pixel that is located adjacent to this pixel.
Figure 14:
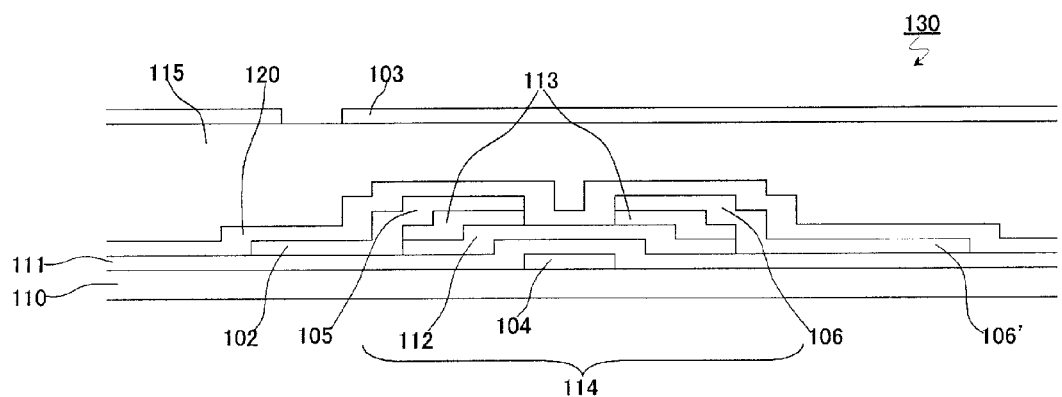
FIG. 14 is a cross sectional diagram of the substrate for a display device along line H-H' of FIG. 13.
Figure 15:
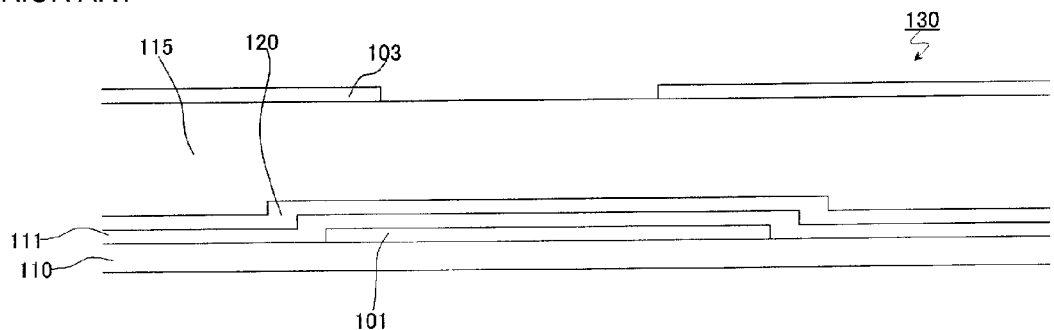
FIG. 15 is a cross sectional diagram of the substrate for a display device along line I-I" of FIG. 13.

Next, with reference to FIG. 4, described is the working effect of the present embodiment that no current leak occurs between the gate line 1 and the pixel electrode 3 in the case of film defect on the upper layer organic insulating film 15. FIG. 11 is a schematic plan diagram showing the state of current leak at the leakage point 800 between the pixel electrode and the gate line caused by peeling of the upper interlayer insulation film in a previous active matrix substrate. FIG. 12 is a schematic cross sectional diagram showing a cross section of the leakage point 800 along line G-G' of FIG. 11.

In the previous active matrix substrate 130, peeling of the upper interlayer insulation film 115 (in the portion of the leakage point 800) due to a foreign substance involved when the upper interlayer insulation film 115 is applied as a film, or due to lack of adhesion at the time of film application, as is clear from the above described manufacturing process, causes etching of the lower interlayer insulation film 120 and the gate insulator 111 in the defect portion on the upper interlayer insulation film 115. As a result, as shown in FIG. 12, the pixel electrode 103 and the gate line 101 make contact with each other, resulting in a pixel defect due to electrical leakage, and causing the reduction in quality of the display and the yield.

According to the present invention, however, the protective film 8 is separately formed of an insulating material on the gate line 1, and therefore, the gate line 1 may be protected against etching when etching is carried out using the upper interlayer insulation film 15 as a mask, and the protective film 8 remains between the pixel electrode 3 and the gate line 1 so that the working effect of preventing pixel loss is gained. Specifically, SiNx having a total thickness of approximately 7000 Å is etched in a process where the lower interlayer insulation film 20 made of SiNx having a thickness of approximately 3000 Å and the gate insulator 11 made of SiNx having a thickness of approximately 4000 Å are etched using the upper interlayer insulation film 15 as a mask, however, addition of SiNx having a thickness of approximately 4000 Å as the protective film 8, permits the sufficient film thickness (substantially 11000 Å in total) of the SiNx film in the portion where the protective film 8 has been formed, and therefore, contact between the gate line 1 and the pixel electrode 3 may be sufficiently prevented.

Embodiment 2

Embodiment 2, which is another embodiment according to the present invention, is described below, with reference to FIGS. 5 to 7. For the purpose of convenience of description, the same symbols are attached to members having the same functions as those shown in the drawings of Embodiment 1, and the descriptions thereof are omitted.

According to Embodiment 2, a protective layer is formed together with a semiconductor layer to form a switching element (TFT), and after that, is separated from the semiconductor layer of the switching element, so as to have a configuration not overlapping the source lines. An active matrix substrate (substrate for a display device) according to Embodiment 2, where such a protective layer (hereinafter referred to also as a protective semiconductor layer), is provided, is described with reference to FIGS. 5 to 7.

Figure 5:
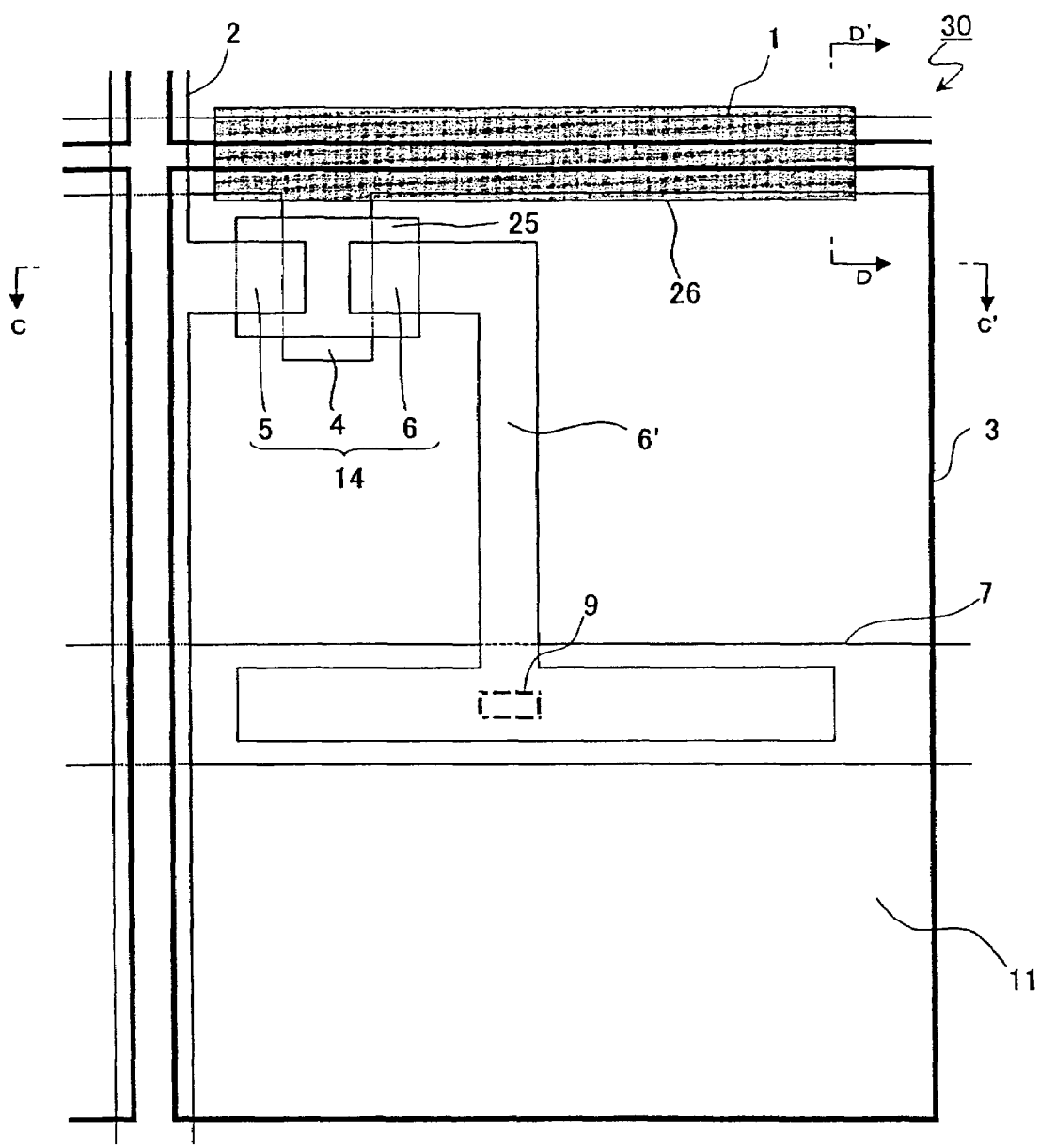
FIG. 5 is a schematic plan diagram showing one pixel in an active matrix substrate (substrate for a display device) according to the present invention (Embodiment 2)
Figure 6:
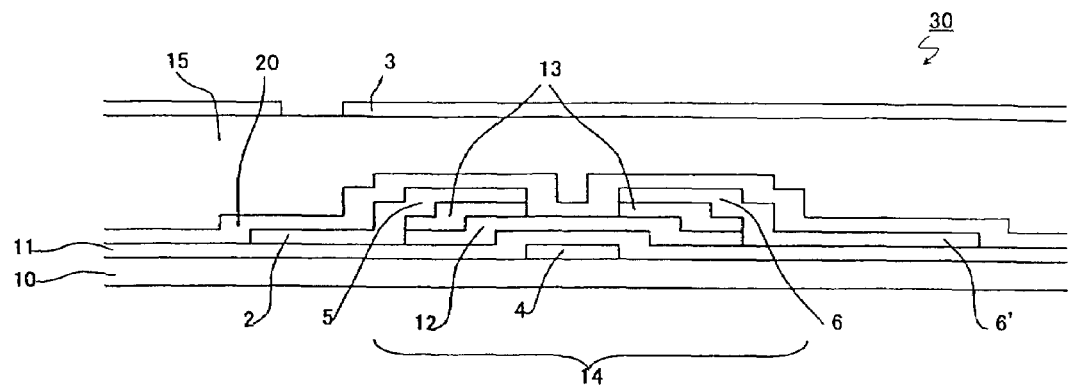
FIG. 6 is a cross sectional diagram of the substrate for a display device along line C-C' of FIG. 5.

FIG. 5 is a schematic plan diagram showing one element in the active matrix substrate 30 according to the present invention. FIG. 6 is a cross sectional diagram showing the substrate for a display device along line C-C' of FIG. 5, and FIG. 7 is across sectional diagram of the substrate for a display device along line D-D' of FIG. 5.

First, an example of a manufacturing method for the active matrix substrate 30 according to the present embodiment is described. In the manufacturing of the active matrix substrate 30 according to the present embodiment, the thin film transistor (TFT) 14 is formed. First, the gate line 1, the gate electrode 4 and the common capacitance line 7 are formed on the insulating substrate 10 made of a transparent insulator, such as glass, in the same process. Next, on top of the surfaces of these, the gate insulator 11 made of SiNx having a thickness of approximately 4000 Å is formed using a mixed gas of an $SiH_4$ gas, an $NH_3$ gas and an $N_2$ gas, the active semiconductor layer 12 made of amorphous silicon having a thickness of substantially 1500 Å is formed using a mixed gas of an $SiH_4$ gas and an $H_2$ gas, and the n type low resistance semiconductor layer 13 having a thickness of approximately 500 Å into which phosphorous has been doped is formed using a mixed gas of an $SiH_4$ gas, a $PH_3$ gas and an $H_2$ gas, sequentially, by means of CVD, followed by photolithography, dry etching and removal of the resist, and thus, an island 25 is formed. At this time, the protective semiconductor layer 26 is simultaneously formed. Furthermore, a film formation, photolithography and dry etching are carried out so as to simultaneously form the source line 2, the source electrode 5, the drain electrode 6 and the lead out drain electrode 6'. Furthermore, sources and drains are separated from the n type low resistance semiconductor layer 13 through etching, and then, the resist is removed. In this manner, the thin film transistor (TFT) 14 is formed.

Then the lower interlayer insulation film 20 made of SiNx having a thickness of approximately 3000 Å is formed using a mixed gas of an $SiH_4$ gas, an $NH_3$ gas and an $N_2$ gas by means of CVD, so as to cover the entire surface of the substrate. After that, the upper layer organic insulating film 15 made of a positive type photosensitive acryl resin having a thickness of approximately 3 μm is formed by means of photolithography so as to have the contact hole 9, the pattern for contacts of terminals for leading out gate line (X of FIG. 16), and the pattern for contacts of terminals for leading out source line (Y of FIG. 17).

Then the lower interlayer insulation film 20 and the gate insulator 11 are sequentially etched by means of dry etching using a mixed gas of a $CF_4$ gas and an $O_2$ gas, using the upper layer organic insulating film 15 as a mask, in order to form the contact hole 9, terminal for leading out gate line 200 and terminal for leading out source line 300.

After that, a transparent electrode is formed by means of sputtering, so as to cover the entire surface of the substrate having he contact hole 9. Next, the transparent electrode that has been formed is patterned by means of photolithography and wet etching, and then, the resist is removed, and thereby, a pixel electrode 3 is obtained.

Figure 7:
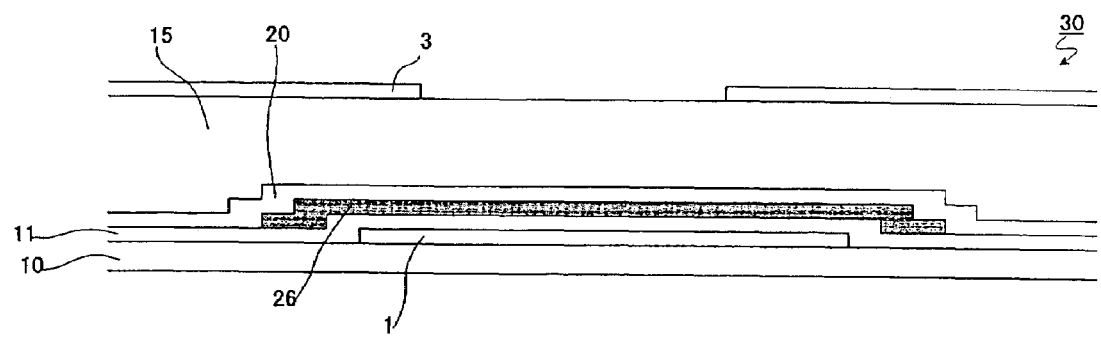
FIG. 7 is a cross sectional diagram of the substrate for a display device along line D-D' of FIG. 5.

Next, with reference to FIG. 7, described is the working effect of the present embodiment that no current leak occurs between the gate line 1 and the pixel electrode 3 in the case of film defect on the upper layer organic insulating film 15.

In the previous active matrix substrate, peeling of the upper interlayer insulation film due to a foreign substance involved when the upper interlayer insulation film is applied as a film, or due to lack of adhesion at the time of film application, as is clear from the above manufacturing process, causes etching of the lower interlayer insulation film and the gate insulator in the defect portion on the upper interlayer insulation film. As a result, as shown in FIG. 12, the pixel electrode 103 and the gate line 101 make contact with each other, resulting in a pixel defect due to electrical leakage, and causing the reduction in quality of the display and the yield.

According to the present invention, however, the protective semiconductor layer 26 is separately formed on the gate line 1, and therefore, the gate line 1 may be protected against etching at the time when etching is carried out using the upper interlayer insulation film 15 as a mask, and the protective semiconductor layer 26 remains between the pixel electrode 3 and the gate line 1, and thus, the working effects of preventing the occurrence of a pixel defect may be obtained. Specifically, SiNx having a total thickness of approximately 7000 Å is etched in the process of etching the lower interlayer insulation film 20 made of SiNx having a thickness of approximately 3000 Å, and the gate insulator 11 made of SiNx having a thickness of approximately 4000 Å using the upper interlayer insulation film 15 as a mask, but the protective semiconductor layer 26 has a film thickness of approximately 1500 Å and the etching selective ratio of SiNx to the protective semiconductor layer 26 is approximately 1:10 at the time when SiNx is etched using a mixed gas of a $CF_4$ gas and an $O_2$ gas, and therefore, a sufficient amount of remaining film of the gate insulator 11 may be secured, and the contact between the gate line 1 and the pixel electrode 3 may be sufficiently prevented.

According to the present embodiment, the protective semiconductor layer 26 is formed together with the semiconductor layer to form the switching element (TFT) 14, and therefore, shortening of the process as compared with Embodiment 1 may be achieved.

Furthermore, according to the present embodiment, the protective semiconductor layer 26 and the semiconductor layer that forms the switching element (TFT) 14 are separated and do not overlap the source line 2 in the configuration, and therefore, the protective semiconductor layer 26 that is provided on the gate line (scan line) 1 and the source line (signal line) 2 which is adjacent to the switching element 14 and is connected to the switching element 14 can be prevented from causing electrical leakage to the drain electrode 6 that is connected to the switching element 14, even in the case where leakage occurs between these, and therefore, a pixel defect may be prevented.

Embodiment 3

Embodiment 3, which is another embodiment according to the present invention, is described below, with reference to FIGS. 8 to 10. And for the purpose of convenience of description, the same symbols are attached to members having the same functions as those shown in the drawings concerning Embodiments 1 and 2, and the descriptions thereof are omitted.

The configuration according to Embodiment 3 is characterized in that a protective semiconductor layer is disposed least in portions where the gate lines (scan lines) and the pixel electrode overlap as viewed in the direction perpendicular to the surface of the insulating substrate in the configuration of Embodiment 2. The active matrix substrate 30 according to Embodiment 3 where such a protective semiconductor layer is provided is described with reference to FIGS. 8 to 10.

Figure 8:
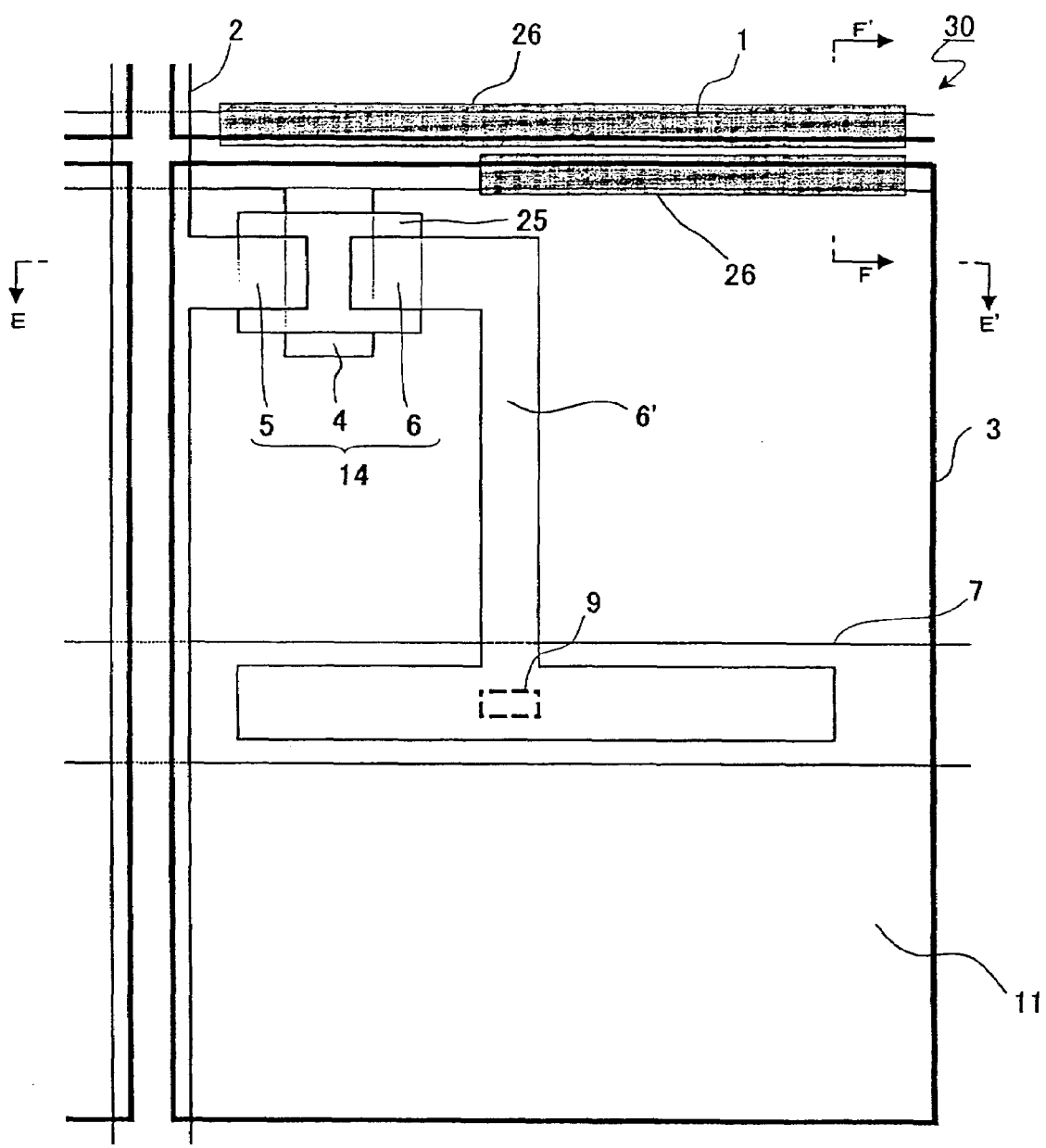
FIG. 8 is a schematic plan diagram showing one pixel in an active matrix substrate (substrate for a display device) according to the present invention (Embodiment 3)

FIG. 8 is a schematic plan diagram showing one pixel in the active matrix substrate 30 according to the present invention.

Figure 9:
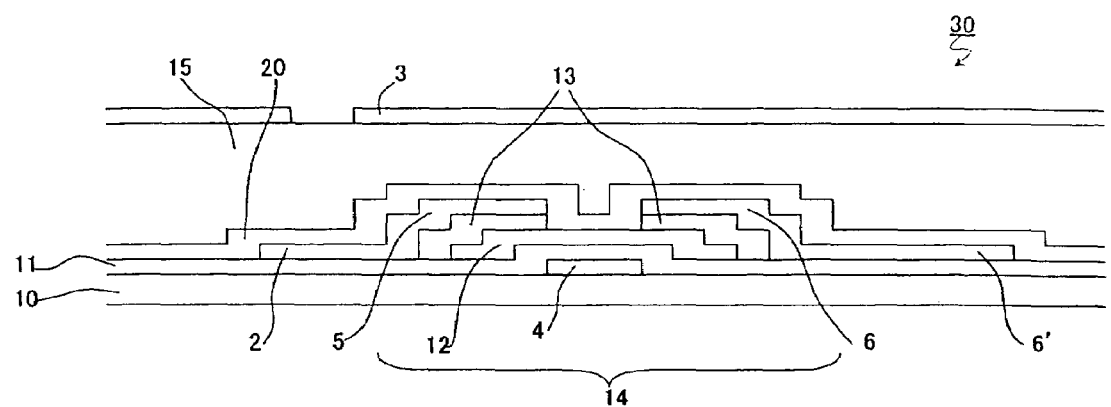
FIG. 9 is a cross sectional diagram of the substrate for a display device along line E-E' of FIG. 8.
Figure 10:
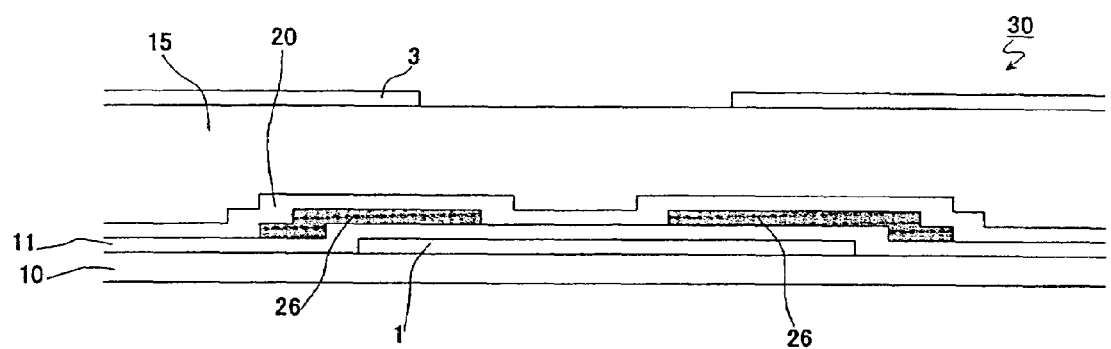
FIG. 10 is a cross sectional diagram of the substrate for a display device along line F-F' of FIG. 8.

FIG. 9 is a cross sectional diagram showing the substrate for a display device along line E-E' of FIG. 8, and FIG. 10 is a cross sectional diagram showing the substrate for a display device along line F-F' of FIG. 8.

First, an example of a manufacturing method for the active matrix substrate 30 according to the present embodiment is described. In the manufacturing of the active matrix substrate 30 according to the present embodiment, the thin film transistor (TFT) 14 is formed. First, the gate line 1, the gate electrode 4 and the common capacitance line 7 are formed on the insulating substrate 10 made of a transparent insulator, such as glass, in the same process. Next, on top of the surfaces of these, the gate insulator 11 made of SiNx having a thickness of approximately 4000 Å is formed using a mixed gas of an $SiH_4$ gas, an $NH_3$ gas and an $N_2$ gas, the active semiconductor layer 12 made of amorphous silicon having a thickness of approximately 1500 Å is formed using a mixed gas of an $SiH_4$ gas and an $H_2$ gas, and the n type low resistance semiconductor layer 13 having a thickness of approximately 500 Å into which phosphorous has been doped is formed using a mixed gas of an $SiH_4$ gas, a $PH_3$ gas and an $H_2$ gas, sequentially, by means of CVD, followed by photolithography, dry etching and removal of the resist, and thus, the island 25 is formed. At this time, the protective semiconductor layer 26 is simultaneously formed. Furthermore, a film formation, photolithography and dry etching are carried out so as to simultaneously form the source line 2, the source electrode 5, the drain electrode 6 and the lead out drain electrode 6'. Furthermore, in a sequential process, sources and drains are separated from the n type low resistance semiconductor layer 13 through etching, and then, the resist is removed. In this manner, the thin film transistor (TFT) 14 is formed.

Then the lower interlayer insulation film 20 made of SiNx having a thickness of approximately 3000 Å is formed using a mixed gas of an $SiH_4$ gas, an $NH_3$ gas and an $N_2$ gas by means of CVD, so as to cover the entire surface of the substrate. After that, the upper layer organic insulating film 15 made of a positive type photosensitive acryl resin having a thickness of approximately 3 μm is formed by means of photolithography so as to have the contact hole 9, the pattern for contacts of terminals for leading out gate line (X of FIG. 16), and the pattern of contacts for terminals for leading out source line (Y of FIG. 17).

Then the lower interlayer insulation film 20 and the gate insulator 11 are sequentially etched by means of dry etching using a mixed gas of a $CF_4$ gas and an $O_2$ gas, using the upper layer organic insulating film 15 as a mask, in order to form the contact hole 9, terminal for leading out gate line 200 and terminal for leading out source line 300.

After that, a transparent electrode is formed by means of sputtering, so as to cover the entire surface of the substrate having the contact hole 9. Next, the transparent electrode that has been formed is patterned by means of photolithography and wet etching, and then, the resist is removed, and thereby, the pixel electrode 3 is obtained.

Next, with reference to FIG. 10, described is the working effect of the present embodiment that no current leak occurs between the gate line 1 and the pixel electrode 3 in the case of film defect on the upper layer organic insulating film.

In the previous active matrix substrate, peeling of the upper interlayer insulation film due to a foreign substance involved when the upper interlayer insulation film is applied as a film, or due to lack of adhesion at the time of film application, as is clear from the above manufacturing process, causes etching of the lower interlayer insulation film and the gate insulator in the defect portion on the upper interlayer insulation film. As a result, as shown in FIG. 12, the pixel electrode 103 and the gate line 101 make contact with each other, resulting in a pixel defect due to electrical leakage, and causing the reduction in quality of the display and the yield.

According to the present invention, however, the protective semiconductor layer 26 is separately formed on the gate line 1, and therefore, the gate line 1 may be protected against etching at the time when etching is carried out using the upper interlayer insulation film 15 as a mask, and the protective semiconductor layer 26 remains between the pixel electrode 3 and the gate line 1, and thus, the working effects of preventing the occurrence of a pixel defect may be obtained. Specifically, SiNx having a total thickness of approximately 7000 Å is etched in the process of etching the lower interlayer insulation film 20 made of SiNx having a thickness of approximately 3000 Å, and the gate insulator 11 made of SiNx having a thickness of approximately 4000 Å using the upper interlayer insulation film 15 as a mask, but the protective semiconductor layer 26 has a film thickness of approximately 1500 Å and the etching selective ratio of SiNx to the protective semiconductor layer 26 is approximately 1:10 at the time when SiNx is etched using a mixed gas of a $CF_4$ gas and an $O_2$ gas, and therefore, a sufficient amount of remaining film of the gate insulator 11 may be secured, and the contact between the gate line 1 and the pixel electrode 3 may be sufficiently prevented.

In addition, the active matrix substrate (substrate for a display device) 30 according to the present Embodiment is characterized in that the protective semiconductor layer 26 is disposed at least at intersections of the gate lines (scan lines) 1 and the pixel electrodes 3 as viewed in the direction perpendicular to the surface of the insulating substrate 10 in the configuration of Embodiment 2, and in such a configuration, an increase in the load capacitance of the gate lines 1 may be restricted to the minimum, and may be more restricted in the case where the protective semiconductor layer 26 is provided so as to completely cover the gate lines 1.

The protective film 8 (protective semiconductor layer 26) is provided only on the gate lines 1 according to the above described Embodiments 1 to 3, but the protective film (protective semiconductor layer) may be provided to the auxiliary capacitance lines 7 in the same manner, and thereby, an effect of preventing current leakage between the auxiliary capacitance line 7 and the pixel electrode 3 may be obtained, according to the present invention.

What is claimed is:

1. A substrate for a display device comprising:
   a scan line;
   a signal line;
   a switching element provided on an insulating substrate;
   an interlayer insulation film; and
   a pixel electrode; wherein
   said switching element is provided at an intersection of the scan line and the signal line;
   said switching element includes a gate electrode connected to the scan line, a source electrode connected to the signal line, and a drain electrode connected to the pixel electrode;
   said interlayer insulation film includes a contact hole for connecting the drain electrode of the switching element to the pixel electrode;
   a protective layer is provided without contact holes above the scan line and/or the signal line;
   a portion of an underlying film under the protective layer contacts a portion of an overlying film over the protective layer; and
   said protective layer is formed of silicon nitride.

2. A substrate for a display device comprising:
   a scan line;
   a signal line;
   a switching element provided on an insulating substrate;
   an interlayer insulation film; and
   a pixel electrode; wherein
   said switching element is provided at an intersection of the scan line and the signal line;
   said switching element includes a gate electrode connected to the scan line, a source electrode connected to the signal line, and a drain electrode connected to the pixel electrode;
   said interlayer insulation film includes a contact hole for connecting the drain electrode of the switching element to the pixel electrode;
   a protective layer is provided without contact holes above the scan line and/or the signal line;
   a portion of an underlying film under the protective layer contacts a portion of an overlying film over the protective layer; and
   said protective layer is formed of silicon dioxide.

3. A substrate for a display device comprising:
   a scan line;
   a signal line;
   a switching element provided on an insulating substrate;
   an interlayer insulation film; and
   a pixel electrode; wherein
   said switching element is provided at an intersection of the scan line and the signal line;
   said switching element includes a gate electrode connected to the scan line, a source electrode connected to the signal line, and a drain electrode connected to the pixel electrode;
   said interlayer insulation film includes a contact hole for connecting the drain electrode of the switching element to the pixel electrode;
   a protective layer is provided without contact holes above the scan line and/or the signal line;
   a portion of an underlying film under the protective layer contacts a portion of an overlying film over the protective layer; and
   said protective layer is formed of a resin.

4. A substrate for a display device comprising:
   a scan line;
   a signal line;
   a switching element provided on an insulating substrate;
   an interlayer insulation film; and
   a pixel electrode; wherein
   said switching element is provided at an intersection of the scan line and the signal line;
   said switching element includes a gate electrode connected to the scan line, a source electrode connected to the signal line, and a drain electrode connected to the pixel electrode;

said interlayer insulation film includes a contact hole for connecting the drain electrode of the switching element to the pixel electrode;

a protective layer is provided without contact holes above the scan line and/or the signal line;

a portion of an underlying film under the protective layer contacts a portion of an overlying film over the protective layer; and said protective layer has substantially the same composition as that of the source electrode and/or the drain electrode that form the switching element.

5. A manufacturing method for forming the substrate for a display device according to claim 4; wherein said manufacturing method for the substrate for a display device includes a process for simultaneously forming the protective layer and the source electrode and/or the drain electrode that form the switching element.

6. A substrate for a display device comprising:

a scan line;

a signal line;

a switching element provided on an insulating substrate;

an interlayer insulation film; and a pixel electrode; wherein said switching element is provided at an intersection of the scan line and the signal line;

said switching element includes a gate electrode connected to the scan line, a source electrode connected to the signal line, and a drain electrode connected to the pixel electrode;

said interlayer insulation film includes a contact hole for connecting the drain electrode of the switching element to the pixel electrode;

a protective layer is provided without contact holes above the scan line and/or the signal line;

a portion of an underlying film under the protective layer contacts a portion of an overlying film over the protective layer;

said interlayer insulation film is formed of at least two layers of insulating film; and the insulating film of the top layer is an organic film.

7. A manufacturing method for forming the substrate for a display device according to claim 6; wherein said manufacturing method for the substrate for a display device includes a process for simultaneously forming the contact hole, a terminal for leading out the scan line, and a terminal for leading out the signal line by carrying out etching using the organic film of the top layer that forms the interlayer insulation film as a mask.

8. A substrate for a display device comprising:

a scan line;

a signal line;

a common capacitance wiring;

a switching element provided on an insulating substrate;

an interlayer insulation film; and a pixel electrode; wherein said switching element is provided at the intersection of the scan line and the signal line;

said switching element includes a gate electrode connected to the scan line, a source electrode connected to the signal line, and a drain electrode connected to the pixel electrode;

said interlayer insulation film includes a contact hole for connecting the drain electrode of the switching element to the pixel electrode;

a protective layer is provided without contact holes above at least one of wirings selected from the group consisting of the scan line, the signal line, and the common capacitance wiring;

a portion of an underlying film under the protective layer contacts a portion of an overlying film over the protective layer; and said protective layer is formed of silicon nitride.

9. A substrate for a display device comprising:

a scan line;

a signal line;

a common capacitance wiring;

a switching element provided on an insulating substrate;

an interlayer insulation film; and a pixel electrode; wherein said switching element is provided at the intersection of the scan line and the signal line;

said switching element includes a gate electrode connected to the scan line, a source electrode connected to the signal line, and a drain electrode connected to the pixel electrode;

said interlayer insulation film includes a contact hole for connecting the drain electrode of the switching element to the pixel electrode;

a protective layer is provided without contact holes above at least one of wirings selected from the group consisting of the scan line, the signal line, and the common capacitance wiring;

a portion of an underlying film under the protective layer contacts a portion of an overlying film over the protective layer; and said protective layer is formed of silicon dioxide.

10. A substrate for a display device comprising:

a scan line;

a signal line;

a common capacitance wiring;

a switching element provided on an insulating substrate;

an interlayer insulation film; and a pixel electrode; wherein said switching element is provided at the intersection of the scan line and the signal line;

said switching element includes a gate electrode connected to the scan line, a source electrode connected to the signal line, and a drain electrode connected to the pixel electrode;

said interlayer insulation film includes a contact hole for connecting the drain electrode of the switching element to the pixel electrode;

a protective layer is provided without contact holes above at least one of wirings selected from the group consisting of the scan line, the signal line, and the common capacitance wiring;

a portion of an underlying film under the protective layer contacts a portion of an overlying film over the protective layer; and said protective layer is formed of a resin.

11. A substrate for a display device comprising:

a scan line;

a signal line;

a common capacitance wiring;

a switching element provided on an insulating substrate;

an interlayer insulation film; and a pixel electrode; wherein said switching element is provided at the intersection of the scan line and the signal line;

said switching element includes a gate electrode connected to the scan line, a source electrode connected to the signal line, and a drain electrode connected to the pixel electrode;

said interlayer insulation film includes a contact hole for connecting the drain electrode of the switching element to the pixel electrode;

a protective layer is provided without contact holes above at least one of wirings selected from the group consisting of the scan line, the signal line, and the common capacitance wiring;

a portion of an underlying film under the protective layer contacts a portion of an overlying film over the protective layer; and said protective layer has substantially the same composition as that of the source electrode and/or the drain electrode that form the switching element.

12. A manufacturing method for forming the substrate for a display device according to claim 11; wherein said manufacturing method for the substrate for a display device has a process for simultaneously forming the protective layer and the source electrode and/or the drain electrode that form the switching element.

13. A substrate for a display device comprising;

a scan line;

a signal line;

a common capacitance wiring;

a switching element provided on an insulating substrate;

an interlayer insulation film; and a pixel electrode; wherein said switching element is provided at the intersection of the scan line and the signal line;

said switching element includes a gate electrode connected to the scan line, a source electrode connected to the signal line, and a drain electrode connected to the pixel electrode;

said interlayer insulation film includes a contact hole for connecting the drain electrode of the switching element to the pixel electrode;

a protective layer is provided without contact holes above at least one of wirings selected from the group consisting of the scan line, the signal line, and the common capacitance wiring;

a portion of an underlying film under the protective layer contacts a portion of an overlying film over the protective layer;

said interlayer insulation film is formed of at least two layers of insulating film; and the insulating film of the top layer is an organic film.

14. A manufacturing method for forming the substrate for a display device according to claim 13; wherein said manufacturing method for the substrate for a display device has a process for simultaneously forming the contact hole, a terminal for leading out the scan line and a terminal for leading out the signal line by carrying out etching using the organic film of the top layer that forms the interlayer insulation film as a mask.

* * * * *